(12) United States Patent
Powers et al.

(10) Patent No.: US 7,082,664 B2
(45) Date of Patent: Aug. 1, 2006

(54) METHOD FOR MOUNTING AN ANCHOR

(75) Inventors: Jeffrey R. Powers, Larchmont, NY (US); Paul Gaudron, Stamford, CT (US)

(73) Assignee: Powers Fasteners, Inc., Brewster, NY (US)

( * ) Notice: Subject to any disclaimer, the term of this patent is extended or adjusted under 35 U.S.C. 154(b) by 0 days.

(21) Appl. No.: 10/294,904

(22) Filed: Nov. 15, 2002

(65) Prior Publication Data
US 2004/0096294 A1    May 20, 2004

(51) Int. Cl.
*B23P 11/00* (2006.01)
(52) U.S. Cl. ............... 29/525.02; 29/525.01
(58) Field of Classification Search ............ 29/525.02, 29/525.01, 525.11, 525.13, 428; 411/383, 411/375, 387.4, 396; 248/59, 62
See application file for complete search history.

(56) References Cited

U.S. PATENT DOCUMENTS

| | | | |
|---|---|---|---|
| 1,897,196 A | 2/1933 | Hunt | |
| 1,929,700 A * | 10/1933 | Malone | .................. 248/74.1 |
| 1,988,813 A | 1/1935 | Seguin | |
| 2,942,819 A | 6/1960 | Brogan | |
| 3,150,890 A | 9/1964 | Sego et al. | |
| 4,488,695 A | 12/1984 | Rumble | |
| 4,536,115 A * | 8/1985 | Helderman | ................. 411/17 |
| 4,636,125 A | 1/1987 | Burgard | ..................... 411/389 |
| 4,764,069 A | 8/1988 | Reinwall et al. | |
| 4,881,861 A | 11/1989 | Hewison | |
| 4,934,634 A | 6/1990 | Breeden, Jr. et al. | |
| 5,009,386 A | 4/1991 | Berger et al. | |
| 5,252,016 A | 10/1993 | Schmid et al. | |
| 5,295,647 A | 3/1994 | Weidler | |
| 5,518,351 A | 5/1996 | Peil | |
| 5,697,746 A | 12/1997 | Brown et al. | |
| 5,755,542 A | 5/1998 | Janusz et al. | |
| 5,769,583 A | 6/1998 | Girbinger | |
| 5,855,042 A | 1/1999 | Bruckner | |
| 6,131,859 A | 10/2000 | Giuliano | |
| 6,146,076 A | 11/2000 | Bodin | |
| 6,185,896 B1 | 2/2001 | Roberts et al. | |
| 6,443,680 B1 | 9/2002 | Bodin | |
| 6,457,922 B1 | 10/2002 | Tsai | |
| 2003/0071514 A1 | 4/2003 | Chen | |

FOREIGN PATENT DOCUMENTS

| | | |
|---|---|---|
| DE | 202 00 213 U1 | 3/2002 |
| WO | WO 02/38897 A1 | 5/2002 |

OTHER PUBLICATIONS

*The Loctile Design Guide for Bonding Metals*, vol. 3, Sections 1-4.6, pp. 2-11.
"Sammys: Self-Drilling • One-Step All-thread Rod Anchoring System," *ITW Buildex*, Internet printout.
"Vertigo," Powers Fasteners, Internet printout.
EP Search Report for EP 03252920.

* cited by examiner

*Primary Examiner*—John C. Hong
(74) *Attorney, Agent, or Firm*—Morgan, Lewis & Bockius LLP

(57) ABSTRACT

An fastener for securing fixtures to buildings or other base materials. The fastener is assembled by a mechanical engagement between two pieces. The first piece includes a first and second bore. The first bore may be connected to a fixture, such as a pipe hanger, and the second bore is mechanically engaged with the second piece, which may include a self-tapping screw.

25 Claims, 3 Drawing Sheets

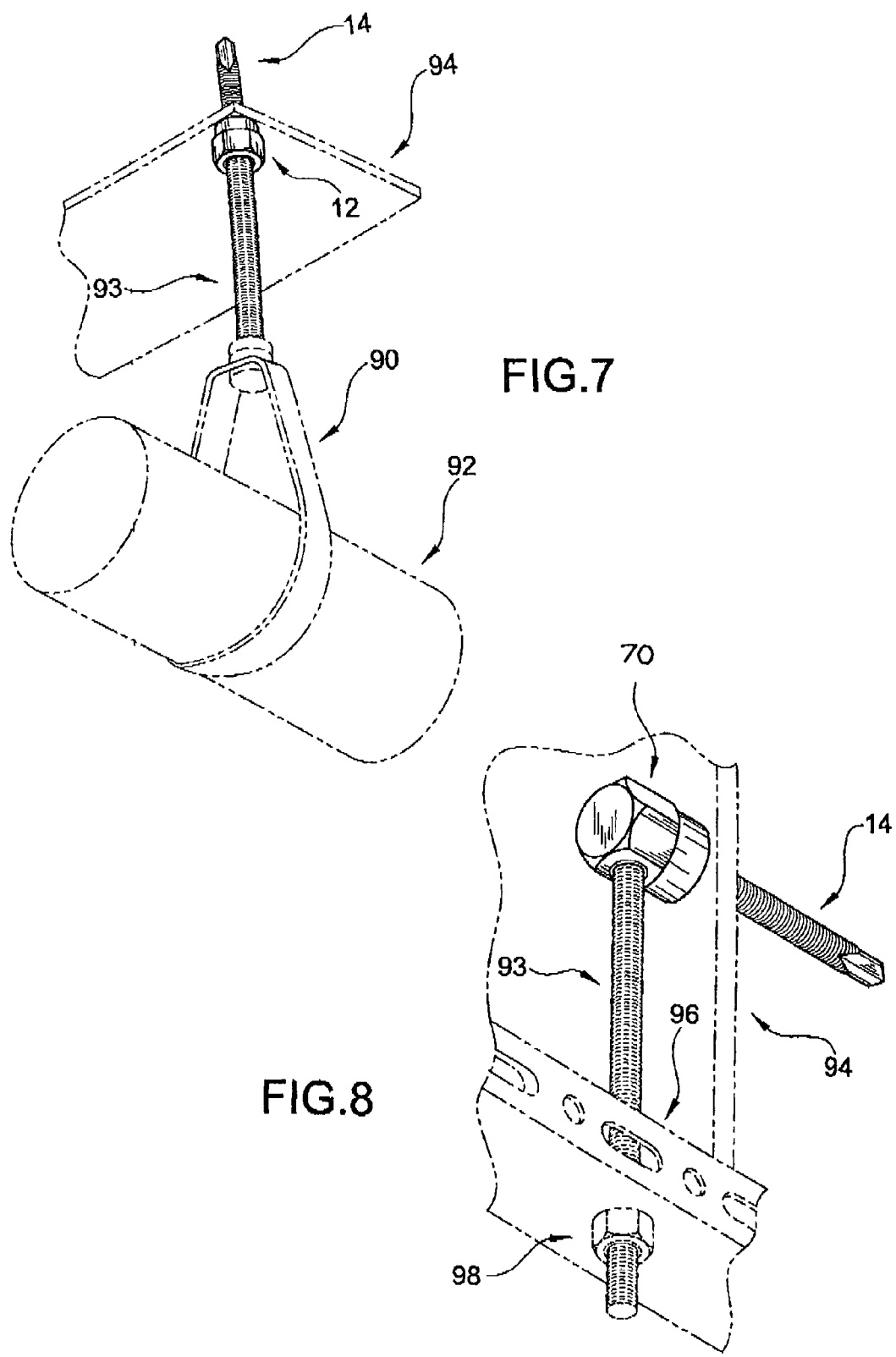

US 7,082,664 B2

METHOD FOR MOUNTING AN ANCHOR

The invention relates generally to an anchor for securing fixtures to buildings or other structure and more particularly to a two-piece anchor assembly.

BACKGROUND OF THE INVENTION

Screw-nut fasteners for mounting structure to buildings and the like are known, as in U.S. Pat. Nos. 5,697,746 and 5,518,351. In these patents, a hex nut is integrally formed with a screw or attached to the screw by welding or via a swaged joint. In other designs, fastening systems include a three or more piece assembly for mounting a fixture, e.g., a pipe hanger, to a building or other type of structure. Examples of such multi-piece anchors are provided in U.S. Pat. Nos. 5,295,647 and 4,934,634.

It would be desirable to have an anchor which is readily adapted for mounting fixtures to a variety of structures but which is simple in design and offers a significant reduction in manufacturing costs. It would also be desirable to provide an anchor assembly which can be manufactured with a standardized fastener for assembly of the anchor, the connection of the anchor to a fixture and/or the structure, and which also has a minimal number of assembled parts and yet is cost effective to produce.

SUMMARY OF THE INVENTION

The above needs are met, and the shortcomings of prior art are overcome by the anchor assembly of the invention. According to one embodiment, a two-piece anchor is used to secure an apparatus to a structure, the apparatus including a fastener. The two-piece anchor includes a first piece including a first bore resembling a nut that is adapted for forming a mechanical interlock with the fastener, and a second threaded bore. A second piece secures the first piece to the structure. The second piece includes a first threaded portion that is securable to the first piece by a mechanical interlock with the second bore and a second threaded portion for securing the second piece to the structure. The first and second bores may have respective first and second diameters, the first diameter being greater than the second diameter and the screw may be a self-tapping screw. The second piece may include a flange disposed between the first and second portions and wherein when the second piece is secured to the first piece, the flange is in mating contact with a lower surface of the second piece. This lower surface may include a chamfered edge to facilitate a locking hold between the first and second pieces. This locking hold may be further assured by using an adhesive. The second piece may correspond to a headless, self-tapping screw which, on one end is formed a threading that corresponds to the first portion and, at the other end, a drill point is formed.

In another embodiment, an anchor is provided. This anchor includes a one-piece connector having formed thereon first and second portions, the first portion including a threaded end and the second portion including an attachment end, and a one-piece coupling having formed thereon first and second fastening portions, the first portion being releasably engaged with the connector by a mechanical interlock between the second end and attachment end, and the second portion being adapted for securing the connector to a mounting surface. In this embodiment, the first end may form a threaded bore and the second portion may form a self-tapping screw.

In another embodiment, a method for mounting an apparatus using a two-part nut and screw fastening assembly is provided. The apparatus may correspond to a pipe hanger, utility tray, ducts, lighting system, sprinkler system, electrical system, drop ceiling or refrigeration system. The method includes the steps of mechanically attaching the screw to the nut via a threaded engagement between the screw and nut, driving a portion of the screw into a base material, and fastening a rod coupling of the apparatus to the nut. The driving step may further include inserting the nut into a socket of a driving tool, e.g., a power drill, and driving the screw into a base material using the driving tool.

In another embodiment, an anchor assembly includes a first piece including a threaded engagement portion integrally formed with a first portion, a second piece including a second portion and a fastening portion, and means for mechanically engaging the first portion and the second portion. The means for engaging may include forming a stud on one of the first portion and second portion and one of a bore and sleeve on the other of the first portion and second portion. The first portion and second portion may each include a threading that facilitates a mechanical interlock between the first and second piece.

Additional features and advantages of the invention will be set forth or be apparent from the description that follows. The features and advantages of the invention will be realized and attained by the structures and methods particularly pointed out in the written description and claims hereof as well as the appended drawings.

It is to be understood that both the foregoing general description and the following detailed description are exemplary and explanatory and are intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate preferred embodiments of the invention and together with the description serve to explain the principles of the invention. In the drawings:

FIG. 7 is a perspective view of a possible use of the first embodiment of the fastener.

FIG. 8 is a perspective view of a possible use of the second embodiment of the fastener.

DETAILED DESCRIPTION OF THE PREFERRED EMBODIMENTS

The anchor of the invention is of a two-piece construction. Each piece of the anchor assembly is of a unitary construction, e.g., a first and second piece of high strength material, such as steel. The first piece may be formed as a nut that is capable of being mechanically engaged with a fixture, e.g., by interlocking threads, and the second piece may include a fastener, such as a screw member, for coupling the first piece to a building or other structure. The first and second pieces are interlocked together to form an anchor. The anchor may be used to mount a pipe hanger, frame or other structure to a wood, steel or concrete structure of a building.

Figure 1:
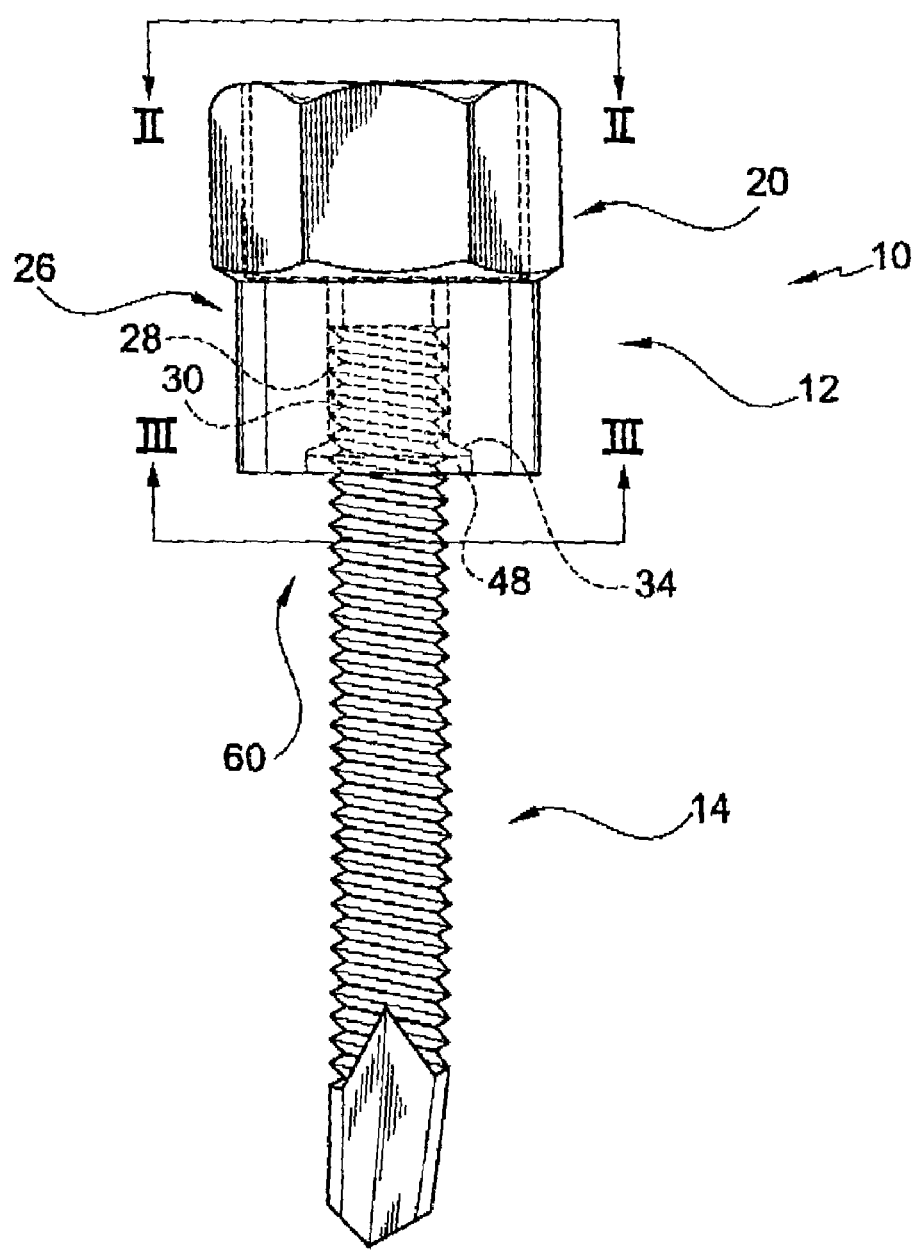
FIG. 1 is a planar view of a first embodiment of an assembled fastener including a nut and a screw member made in accordance with the principles of the invention.
Figure 2:
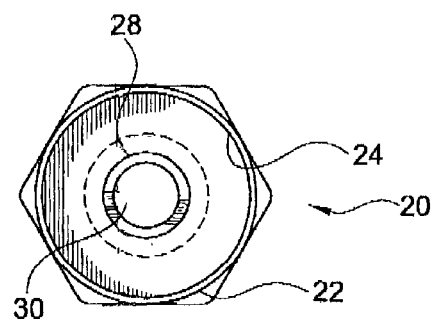
FIG. 2 is top view of the nut of the fastener of FIG. 1 taken at section II—II in FIG. 1.
Figure 3:
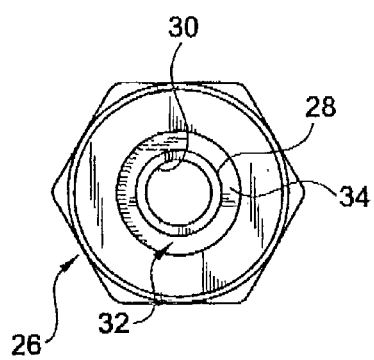
FIG. 3 is a bottom view of the nut taken at section III—III in FIG. 1.
Figure 4:
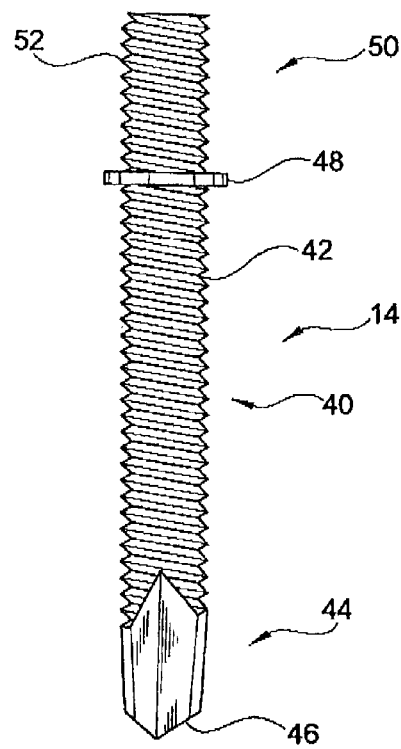
FIG. 4 is a side view of the screw member of the fastener of FIG. 1.
Figure 5:
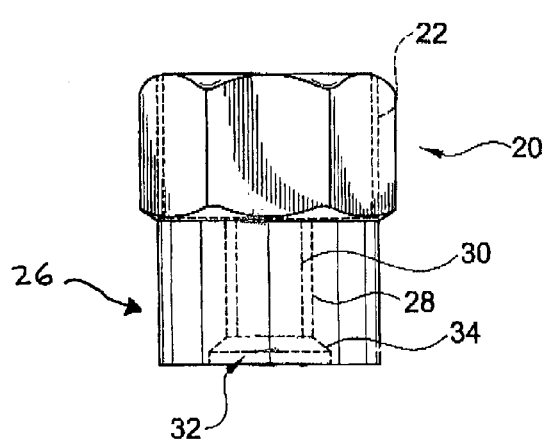
FIG. 5 is a side view of the nut of FIG. 1.

One example of the invention is illustrated in FIGS. 1–5. In this embodiment, a fastener 10 includes a nut 12 and a screw member 14 connected to nut 12 by a fastening structure 60. Preferably, fastening 60 is provided by a threaded engagement between screw 14 and nut 12. Fastening 60 may alternatively be provided by a threaded stud formed on nut 12 which is received in a threaded sleeve (or bore) formed on screw. 14. In the illustrated embodiment, fastening 60 includes threading 52 on stud 50 engaged with threading 30 of lower bore 28. Referring to FIGS. 1, 3 and 5, fastening 60 preferably also includes a recess 32 including a chamfered-like surface 34 formed at a lower end of lower portion 26 for engagement with flange 48 of screw member 14. By including recess 32 with chamfered surface 34, rotation of screw member 14 into recess and into mating engagement with surface 34 will promote a frictional hold between screw member 14 and nut 12, thereby reducing the chance that a torque applied to the screw or nut will result in relative rotation between the screw and nut. The mechanical connection between screw member 14 and nut 12 may also be made permanent by, e.g., an adhesive, such as Loctite, applied to the threading.

Referring to FIGS. 2, 3 and 5, nut 12 preferably includes a first bore 22 formed at an upper portion 20, which has an outer surface preferably resembling a hex nut, and a second bore 28 formed at a lower portion 26 of nut 12. In the illustrated embodiment, first and second bores 22, 28 define a stepped-diameter hole that extends through nut 12. In an alternative embodiment, nut 12 may have a solid, intermediate section disposed between and separating first and second bores 22, 28. The intermediate section may include a conventional straight or cross-recess slot, or polygonal shaped protrusion (or recess) formed on its surface to facilitate engagement of a screw driver with nut 12 by inserting the screwdriver into upper bore 22. A threading 24 may be formed along the inner walls of bore 22 to facilitate a mechanical engagement with a complimentary threaded stud or rod of a fixture that is to be secured to a base material. Other types of interlocking engagements between bore 22 and a stud may be used (e.g., key-hole, interlocking teeth or teeth received in L-shaped channels). The pitch of threading 24 may be greater than the pitch of threading 30 of bore 28, and bore 22 may have a larger diameter than bore 28, as can be seen in FIGS. 2, 3 and 5. Threading 24 of upper bore 22 and threading pairs 30 and 52 are oriented such that when a mating rod of the fixture is secured to nut 12, the applied torque will tend to tighten the engagement between stud 50 and lower portion 26.

Referring to FIG. 4, screw member 14 includes a lower part 40, stud 50 with threading 52 and a flange 48 formed between stud 50 and lower part 40. Screw 14 may resemble a headless screw, as shown in FIG. 4. End 44 of screw member 14 may be formed as a drill point 46 so that screw member 14 may be used as a self-tapping screw. In the illustrated. embodiment, drill point 46 is adapted for securing screw member 14 into an untapped metal structure (e.g., an I-beam), but may alternatively be shaped to secure screw member 14 into an untapped wood structure. Of course, lower part 40 may alternatively be securable in a preformed hole (e.g., for a concrete base material). The pitch of threading 52 of stud 50 may have the same or different pitch as threading 42 of lower part 40, depending on the application. For example, in wood applications, the pitch of threading 42 would typically be greater than the pitch of threading 52. The same threading 52 may be used for lower parts 40 having a threading and/or drill point adapted for engaging, e.g., a concrete, wood, or steel base material so that one nut 12 type may be used for a variety of base material.

In alternative embodiments of fastening 60, lower portion 26 of nut 12 may have a bore with teeth formed at, e.g., 120 degree increments, which are vertically inserted into vertical parts of corresponding L-shaped channels formed on stud 50 (the teeth and channels may alternatively be formed on the stud and nut, respectively). After teeth have been fully inserted into the vertical parts of the L-shaped channels, they oppose a horizontal part of the channel. The nut 12 would then be twisted such that the teeth enter the horizontal channel and achieve a locking fit within the channel (e.g., by a detent formed between the teeth and horizontal channel). Other embodiments of a mechanical, interlocking connection between nut 12 and screw 14 are contemplated, such as a key-hole connection or interlocking teeth. The stud or bore portion of fastening 60 (whether the stud is located on screw 14 or nut 12) may also include a plastic piece (e.g., a lining) that is deformed when screw 14 is inserted into bore 28 so as to facilitate a lock between nut 12 and screw 14.

Figure 6:
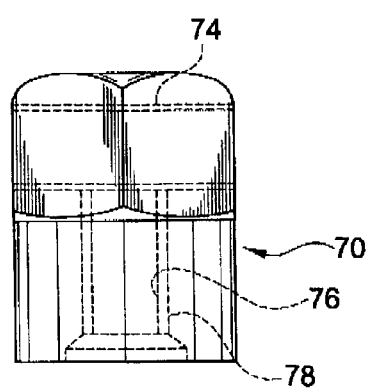
FIG. 6 is a side view of a nut according to a second embodiment of the invention.

In the first embodiment of the invention, bores 22 and 28 are co-axial with each other, as illustrated in FIG. 5. In a second embodiment, fastener assembly may include a nut where the bores may be orientated off axis from each other, e.g., at 90 degrees to each other. Such an embodiment is illustrated in FIG. 6. Nut 70 includes a horizontally extending first bore 74 and vertically extending second bore 78. Nut 70 may be fastened to screw member 14. Preferably, the threading 76 and diameter of bore 78 is the same as threading 30 and diameter of bore 28 of nut 12 so that the two nuts may be readily interchanged to attach to a mounting rod.

In a preferred embodiment, upper portion 20 of nut 12 is shaped to resemble a hex nut which may be received into a conventional socket for mounting to a chuck of a power drill or other tool used to drive fastener 10 into a base material. Alternatively, upper portion 20 may take on a square or polygonal shape (e.g., octagonal) or upper portion may be cylindrical in shape. In the later case, a tool bearing surface may be provided by a way of an intermediate section disposed between bores 22 and 28, as discussed above.

Two possible uses of the first and second embodiments of a fastener are illustrated in FIGS. 7 and 8. In FIG. 7, nut 12 is used to mount a pipe 92 to a first base material 94, which may be a ceiling of a building. The fastener may be secured to base material 94, and then rod 93 may be secured to nut 12. At the opposite end, rod 93 is engaged to cradle 90 which supports pipe 92. In FIG. 8, nut 70 is used to mount a cable tray 96 to a second base material 94, which may be a beam, truss or column. For nut 70 having the same bore and threading as nut 12, the same rod 93 may be used. Fastener 10 may be readily used to mount other types of fixtures to a base material, without departing from the scope of the invention.

What is claimed is:

1. A method for mounting an apparatus having a threaded rod to a structural base material, the method comprising the steps of:

positioning next to the base material a two-piece anchor including a nut and a headless threaded screw, the nut including a first threaded bore to receive the threaded rod, a second threaded bore engaged with at least a portion of the threaded screw received therein, and a chamfered annular surface concentrically aligned with the second threaded bore, the headless threaded screw including a fixedly attached flange engaged with the chamfered surface of the nut for locking the screw to the nut;

driving a portion of the screw into the base material; and fastening the rod to the nut.

2. The method of claim 1, further including the steps of using a drill point at one end of the screw for driving the screw into the base material.

3. The method of claim 1, wherein the driving step further includes the steps of placing the nut into a socket of a driving tool and driving the screw into the base material using the driving tool.

4. The method of claim 1, wherein the providing step further includes an adhesive applied to at least one of the nut and screw to facilitate a permanent connection between the nut and screw.

5. The method of claim 1, further including the headless screw comprising a threaded stud at one end and the screw portion at the other.

6. A method for securing a pipe fixture to a base material, the method comprising the steps of:

providing a two-part fastening assembly including:
an upper part including a first portion adapted for being mechanically engaged with the pipe fixture, a second threaded portion, and a chamfered annular surface concentrically located with respect to the second threaded portion, and
a lower part including a third threaded portion adapted for engaging the second threaded portion of the upper part, a fourth threaded portion adapted for engaging a base material, and a flange fixedly attached between the third and fourth threaded portions;

fixing the upper part to the lower part by engaging the second threaded portion with the third threaded portion;

engaging the flange of the lower part with the chamfered annular surface of the upper part;

inserting the fourth threaded portion into the base material; and securing the pipe fixture to the base material by fixing the fixture to the first portion.

7. The method of claim 6, wherein the providing step further includes providing a threading for the first portion and the securing step includes engaging the fixture and the first portion using a threaded engagement.

8. The method of claim 6, wherein the fixing step is performed prior to the inserting step.

9. The method of claim 6, wherein the providing step includes providing a first bore and a second bore for the first and second portions, respectively, the first bore having a diameter that is greater than the diameter of the second bore.

10. The method of claim 6, wherein the securing step further includes providing the upper part as a nut.

11. The method of claim 6, wherein the fixing step includes the third threaded portion having male threads and being screwed into the second thread portion having female threads and the securing step includes a threaded rod of the fixture being screwed into the first portion having mating threads.

12. The method of claim 6, wherein the securing step further includes screwing a thread rod of the fixture into the first portion having female threads, the rod being coupled to a pipe cradle.

13. The method of claim 6, wherein the providing step further includes providing a lower part that is a unitary screw devoid of a head, and wherein the third threaded portion comprises a stud for engaging the second threaded portion of the upper part.

14. The method of claim 13, wherein the flange is formed between the stud and the fourth threaded portion.

15. The method of claim 6, wherein the first portion includes a first threaded bore for engaging the pipe fixture and the second threaded portion is a second threaded bore.

16. The method of claim 15, wherein the first and second threaded bores are coaxially oriented with each other.

17. The method of claim 15, wherein the first threaded bore is oriented off axis from the second threaded bore.

18. The method of claim 17, wherein the first threaded bore is axially oriented at about a 90 degree angle from the second threaded bore.

19. A method for preparing a two-piece anchor suitable for mounting an apparatus to a structural base material, the method comprising the steps of:

positioning a first anchor piece proximate to a second anchor piece, the first anchor piece having a first bore for mechanically interlocking with the apparatus and a threaded second bore, the second anchor piece having a first threaded portion configured for mating with the threaded second bore of the first anchor piece and a second threaded portion for securing the second anchor piece to the base material and;

rotatably inserting the first threaded portion of the second anchor piece in the threaded second bore of the first anchor piece to couple the first and second two anchor pieces together; and engaging a locking member fixedly attached between the first and second threaded portions of the second anchor piece with a recessed surface disposed inside the threaded second bore of the first anchor piece, wherein the locking member engagement with the recessed surface promotes frictional hold between the first and second anchor pieces.

20. The method of claim 19, wherein the locking member is a circular flange and the recessed surface is annular in shape having an opening therethrough to receive at least part of the first threaded portion of the second anchor piece.

21. The method of claim 20, wherein at least part of the recessed surface includes a chamfered surface.

22. The method of claim 19, wherein the first bore of the first anchor piece is threaded to receive a complimentary threaded portion of the apparatus for mechanically interlocking the apparatus to the first piece.

23. The method of claim 19, wherein the first bore and second threaded bore of the first anchor piece each have an axis extending therethrough respectively and the first bore and second threaded bore are oriented off axis from each other.

24. The method of claim 19, wherein at least part of the first anchor piece is configured as a nut.

25. The method of claim 19, wherein the first threaded portion is a stud and the second threaded portion includes a drill point for securing in the base.

* * * * *